(No Model.)
R. MORGAN.
CORK EXTRACTOR.
No. 270,095. Patented Jan. 2, 1883.
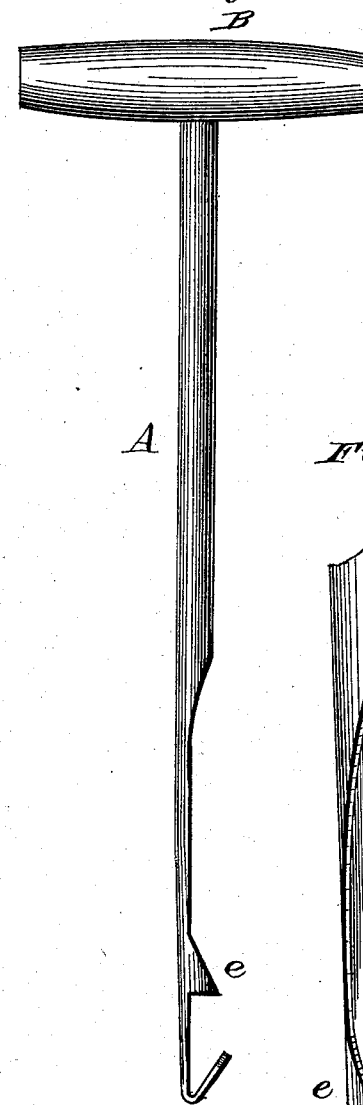
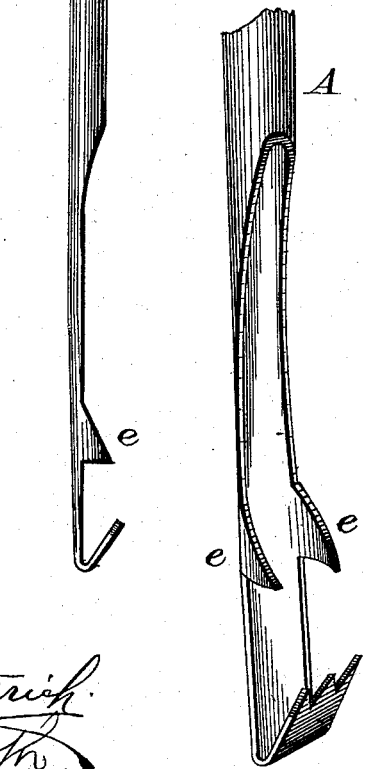
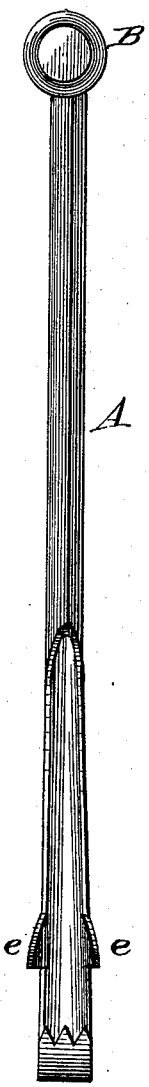
Witnesses:
Phil C. Dietrich
W. R. Keyworth
Inventor:
Robert Morgan
by **** Alexander
Attorney.

UNITED STATES PATENT OFFICE.

ROBERT MORGAN, OF STOCKTON, CALIFORNIA.

CORK-EXTRACTOR.

SPECIFICATION forming part of Letters Patent No. 270,095, dated January 2, 1883.

Application filed November 6, 1882. (No model.)

*To all whom it may concern:*

Be it known that I, ROBERT MORGAN, of Stockton, in the county of San Joaquin and State of California, have invented certain new and useful Improvements in Cork-Extractors; and I do hereby declare that the following is a full, clear, and exact description thereof, reference being had to the accompanying drawings, and to the letters of reference marked thereon, which form part of this specification, in which—

Figure 1 is a side elevation. Fig. 2 is a front elevation, and Fig. 3 is an enlarged perspective of the lower portion of the device.

The object I have in view is to provide a simple and effective method of extracting corks from bottles when the cork has been pushed through the neck of the bottle; and to this end my invention consists essentially in bending upwardly the lower end of the shank, at an angle thereto of about forty-five degrees, (more or less,) and forming on the sides of the shank guides or holding-projections, by means of which the cork will be kept straight, or in line with the shank, all substantially as will be hereinafter set forth.

In order that others may avail themselves of the benefits of my invention, I will now describe the manner in which I prefer to construct it.

A represents the shank of my extractor, and B its handle. The shank may consist of a tube of suitable metal and size, with the lower portion thereof cut away or sloped off to form a slight trough, in which the cork may rest when in proper position to be drawn from the bottle.

e e indicate ears or projections, which are intended to serve as guides and supports to the cork, and thus prevent it from getting out of line with the shank when in process of being withdrawn from the bottle. The lower end of the shank is flattened and turned up at about an angle of forty-five degrees, as fully seen in the drawings, and may terminate either with an edge or serrations. I prefer, however, the latter mode of construction, as the teeth will more effectually prevent the cork from slipping when once engaged.

I do not confine myself to the exact mode of construction herein set forth or shown by the drawings, as it is manifest that unimportant or merely colorable variations may be made without in the least departing from the spirit of my invention. I have described the shank as made from a tube; but it may be better to stamp a blank, as seen in Fig. 2, and then give the proper formation by afterward bending.

Having thus described my invention, what I claim, and desire to secure by Letters Patent, is—

1. A cork-extractor having its lower end turned at an angle to the shank, and adapted to engage and draw a cork from a bottle, substantially as set forth.

2. A cork-extractor consisting of a shank provided with guides or supports, and having its lower end turned up, all substantially as described.

In testimony that I claim the foregoing as my own I affix my signature in presence of two witnesses.

ROBERT MORGAN.

Witnesses:
STANTON L. CARTER,
E. C. ARNOLD.